United States Patent
Tarrerias

(10) Patent No.: US 8,096,221 B2
(45) Date of Patent: Jan. 17, 2012

(54) METHOD OF PRODUCING A CUTTING BLADE AND CUTTING BLADE THUS PRODUCED

(75) Inventor: Eric Tarrerias, Pont du Chateau (FR)

(73) Assignee: Societe d'Exploitation Tarrerias Bonjean, Chabenty (FR)

( * ) Notice: Subject to any disclaimer, the term of this patent is extended or adjusted under 35 U.S.C. 154(b) by 0 days.

(21) Appl. No.: 10/589,900

(22) PCT Filed: Feb. 18, 2005

(86) PCT No.: PCT/FR2005/000390
§ 371 (c)(1),
(2), (4) Date: Aug. 18, 2006

(87) PCT Pub. No.: WO2005/089995
PCT Pub. Date: Sep. 29, 2005

(65) Prior Publication Data
US 2007/0163128 A1 Jul. 19, 2007

(30) Foreign Application Priority Data

Feb. 18, 2004 (FR) ..................... 04 01616
Apr. 8, 2004 (FR) ..................... 04 03711

(51) Int. Cl.
B27B 33/14 (2006.01)
B27B 13/02 (2006.01)
B23D 57/00 (2006.01)
B21K 11/00 (2006.01)
(52) U.S. Cl. .......... 83/835; 76/104.1; 76/106.5
(58) Field of Classification Search ............ 76/104.1, 76/106.5; 83/835–845
See application file for complete search history.

(56) References Cited

U.S. PATENT DOCUMENTS

| | | | |
|---|---|---|---|
| RE26,676 E * | 9/1969 | Anderson et al. | 76/112 |
| 4,269,868 A | 5/1981 | Livsey | |
| 5,724,868 A * | 3/1998 | Knudsen et al. | 76/104.1 |
| 5,799,549 A * | 9/1998 | Decker et al. | 76/104.1 |
| 6,146,476 A | 11/2000 | Boyer | |
| 6,316,065 B1 * | 11/2001 | Wallmann | 427/596 |
| 6,363,827 B1 * | 4/2002 | Osing et al. | 83/835 |
| 6,612,204 B1 * | 9/2003 | Droese et al. | 76/104.1 |
| 7,210,388 B2 * | 5/2007 | Pacher et al. | 83/835 |
| 2002/0068008 A1 * | 6/2002 | Shipton et al. | 420/445 |
| 2003/0019111 A1 | 1/2003 | Korb et al. | |
| 2003/0019332 A1 * | 1/2003 | Korb et al. | 76/104.1 |
| 2003/0154841 A1 * | 8/2003 | Pacher et al. | 83/835 |
| 2004/0016132 A1 * | 1/2004 | Dion et al. | 30/350 |
| 2004/0237722 A1 * | 12/2004 | Ponemayr | 76/112 |

FOREIGN PATENT DOCUMENTS

| | | |
|---|---|---|
| CA | 2451514 A1 | 6/2002 |
| DE | 3219260 A1 | 11/1983 |
| DE | 4130207 A1 | 3/1993 |
| DE | 3208153 | 9/1993 |
| EP | 0707921 A2 | 4/1996 |
| JP | 58177138 | 10/1983 |
| JP | 62181836 | 8/1987 |
| WO | WO 01/02118 | 1/2001 |
| WO | WO 03/000457 | 1/2003 |

* cited by examiner

Primary Examiner — Ghassem Alie
Assistant Examiner — Bharat C Patel

(57) ABSTRACT

A method of fabricating a blade for a cutting tool, in particular for a knife, a pair of scissors, a saw, a household appliance, or indeed an industrial tool, the blade being made of steel or an alloy of stainless steel with a cutting edge extending over a portion of its periphery. The cutting tool fitted with a blade presents great resistance to wear of the cutting edge of the blade.

16 Claims, 3 Drawing Sheets

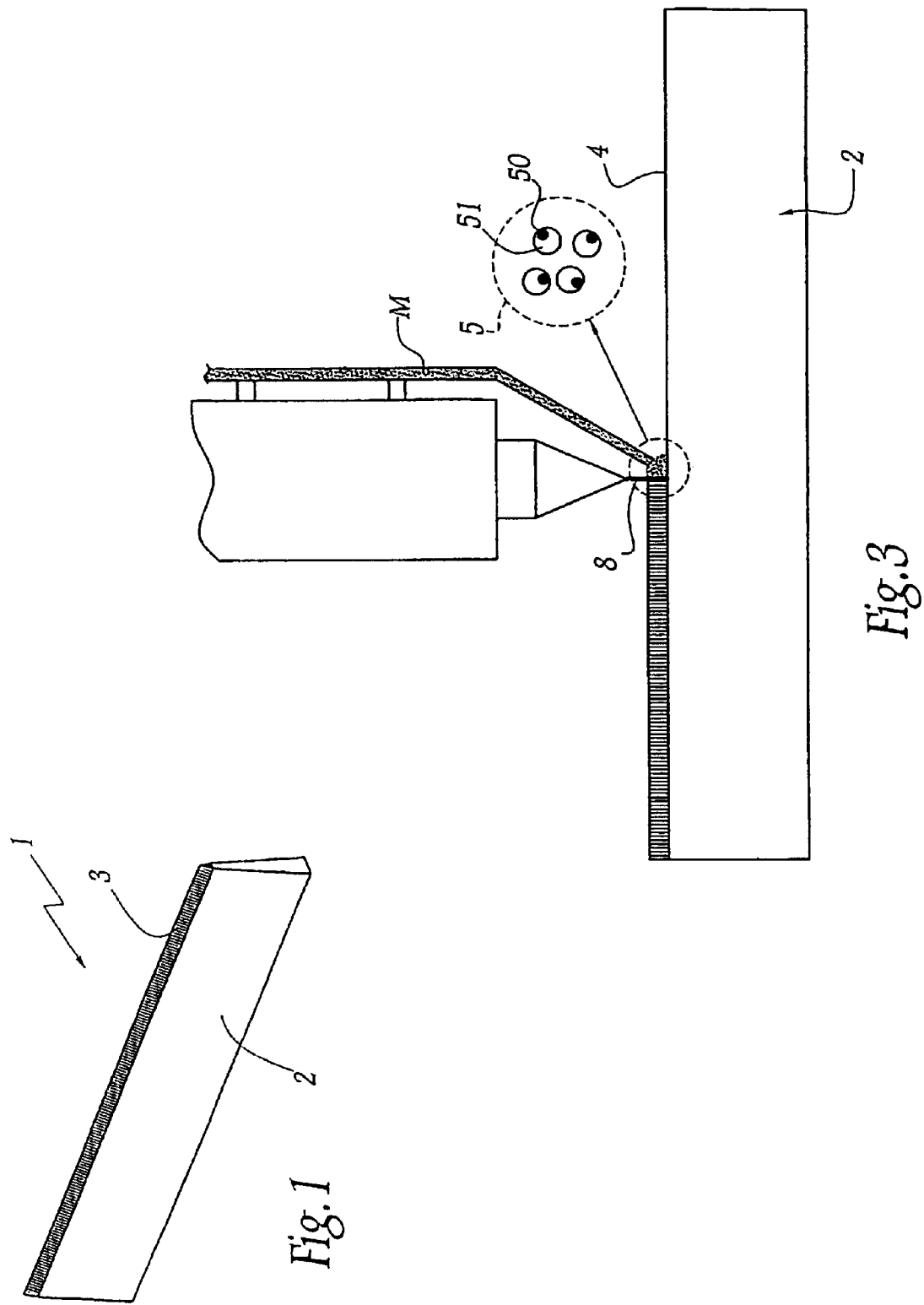

METHOD OF PRODUCING A CUTTING
BLADE AND CUTTING BLADE THUS
PRODUCED

BACKGROUND OF THE INVENTION

1. Field Of The Invention

The invention relates to a method of fabricating a blade for a cutting tool, in particular for a knife, a pair of scissors, a saw, a household appliance (which may optionally be electrical), or indeed an industrial machine, the blade having at least one cutting edge extending over at least a portion of its periphery.

2. Brief Description Of The Related Art

In the meaning of the invention, a cutting tool of a household appliance includes chopper or slicer blades, regardless of whether the cutting tool possesses a blade provided with an edge that is rectilinear or not rectilinear, and regardless of whether it is driven manually or by external motor drive. By way of example, the tool may be an industrial machine having a circular blade, or indeed an annular blade, and suitable for use in the agrifood business, and in particular in slaughter houses.

Such blades are used for slicing or cutting various materials and they are made of metal or metal alloy. In particular, such blades are made of stainless steels of hardnesses that are adapted to the use intended for the tool. In all cases, such steels advantageously comply with the standards and/or regulations in force concerning food-grade materials, i.e. the physical and/or chemical properties of materials that come into contact with food. It is also possible to encounter blades made from one or more ceramics or other materials suitable for cutting or slicing when used under particular conditions.

What these blades have in common is being provided with at least one cutting edge, said edge forming the zone of the blade that comes into contact with the material for cutting, via at least one point. Such blades are liable to present premature wear of the cutting edge, in particular when used repeatedly and/or when used badly. It is then necessary to re-form the cutting edge by sharpening, filing, or grinding. In any event, this operation cannot be repeated indefinitely. It requires the cutting edge to be formed in a zone of the blade, close to the back of the blade and of thickness that increases each time this operation is repeated.

Methods are known in which the cutting edge is of hardness greater than the hardness of the remainder of the blade in order to limit wear thereof. In particular, WO-A-03/000457 describes a method in which, on the blade of a saw, material is deposited in powder form, mixed and solidified with the help of a laser, prior to being shaped to form the cutting edge. The cutting edge is formed between two rollers of the rolling mill type, which serve to form the cutting edge while hot. The laser serves to bring the material up to temperature. Such a device is particularly adapted to blades in strip form, but it is not suitable for use on any type of blade. In addition, the bond between the body of the blade and the shaped material is not as good as it might be.

So-called "facing" methods are also known in which a covering of hard material is deposited on an edge of a cutting blade. Such methods, e.g. making use of microwelding, are described in Patent Abstracts of Japan, Vol. 2000, No. 17, JP-A-01029288.

Patent Abstracts of Japan, Vol. 0120, No. 27, JP-A-62 18 1836 describes using a film for facing the cutting edge of a blade by ion plating. That can also be done by vaporization under the effect of a flame as described in EP-A-0 707 921. It is also possible to envisage depositing make-up material on a blade after heating the material to a temperature below its melting temperature and pressing it against the body of the blade so that it adheres thereto, prior to forming the cutting edge, and this is described in particular in DE-A-3 208 153.

In none of those documents is there described a method enabling a make-up material to be bonded in effective and durable manner with the remainder of the blade so that once the cutting edge has been formed the strength and mechanical properties of the assembly are preserved.

Those are the drawbacks that the present invention seeks more particularly to remedy by proposing a method of fabricating a blade that enables the cutting edge of the blade to be preserved, and thus enables the lifetime thereof to be increased.

SUMMARY OF THE INVENTION

To this end, the invention provides a method of fabricating a blade for a cutting tool, in particular for a knife, a pair of scissors, a saw, a household appliance, or indeed an industrial tool, the blade being made of steel or an alloy of stainless steels and having at least one cutting edge extending over at least a portion of its periphery, the method being characterized in that it comprises the following steps:

a) making a blade body possessing at least one free edge provided in the vicinity of the location of the or each cutting edge;

b) projecting a make-up material in the form of a powder onto at least one free edge, the hardness of the make-up material being greater than the hardness of the blade body;

c) subjecting the make-up material powder to a laser beam so as to form a bead or strip on at least a portion of said free edge; and d) forming the cutting edge in the bead or strip of make-up material.

Thus, by means of the method of the invention, a blade is made having a cutting edge formed in a make-up material of hardness that is greater than that of the blade. This makes it possible to obtain a blade having a cutting edge of quality and lifetime that are better than those commonly encountered. This method of fabricating a blade gives it a high degree of modularity and the use of a laser beam ensures intimate melting between the body of the blade and the make-up material.

According to advantageous but non-essential aspects of the invention, the method may incorporate one or more of the following steps:

the free edge is formed by a flat horizontal surface extending perpendicularly to a main plane of the blade body;

the free edge is formed by a portion of the blade body extending in a main plane oriented at a non-zero angle relative to a main plane of the blade body;

the blade body presents dimensions that are slightly smaller than those of the final blade;

the cutting edge is made by grinding, machining, or abrading at least the bead or the strip of make-up material;

the blade body is machined or ground at the same time as the cutting edge is being made by machining or grinding;

the blade body is machined or ground before the step of forming the bead of make-up material;

prior to step d) of forming the cutting edge, a hardening and tempering operation is performed on the blade body fitted with the bead or strip of make-up material; and said removal of material is performed from an edge of the blade body opposite, relative to the main plane, from the edge of the blade body on which the make-up material is deposited.

The invention also provides a blade for a cutting tool, in particular a knife, a pair of scissors, a saw, a household appliance, or an industrial machine, the blade having at least one cutting edge on at least a portion of its periphery, and being characterized in that it comprises a blade body, the cutting edge being supported on one edge of said blade body.

The cutting edge and the blade body are made of at least two different materials.

A cutting tool, in particular a knife, a pair of scissors, a saw, a household appliance, or indeed an industrial machine, including at least one blade as defined above.

The invention can be better understood and other advantages thereof appear more clearly in the light of the following description of two implementations of a fabrication method in accordance with the invention, given purely by way of example and made with reference to the accompanying drawings, in which:

BRIEF DESCRIPTION OF DRAWINGS

FIG. 1 is a perspective view of a cutting tool blade made in accordance with the invention;

FIG. 3 is a face view showing steps b) and c) of this fabrication method, with an enlargement showing a type of powder made up of two elements;

DESCRIPTION OF THE PREFERRED EMBODIMENT

The blade 1 shown in FIG. 1 is drawn in simplified form. It is also provided with a support or fastener means (not shown) for the blade, and/or handle means (likewise not shown) for the blade, e.g. a knife handle. The blade 1 presents a blade body 2 of dimensions that are slightly smaller than the overall size of the finished blade 1. The blade body 2 supports a cutting edge 3 in which the cutting edge proper, i.e. the zone that comes into contact with the substance for cutting, is constituted by the make-up material. The blade body 2 is made of at least one stainless steel, advantageously of food grade. For example it may be a standard steel in compliance with the AISI standard: 304L, 316L, 410, 420A, 420B, 420C, 425, 431, 440A, 440B, 440C, or it may be one of steels of the kind sold by the supplier Sandvik under the references 12C27 and 19C27. The blade body 2 is made using conventional techniques, such as, for example: machining, molding, forging, sintering, grinding, cutting out, or cutting out by laser.

Figure 2:
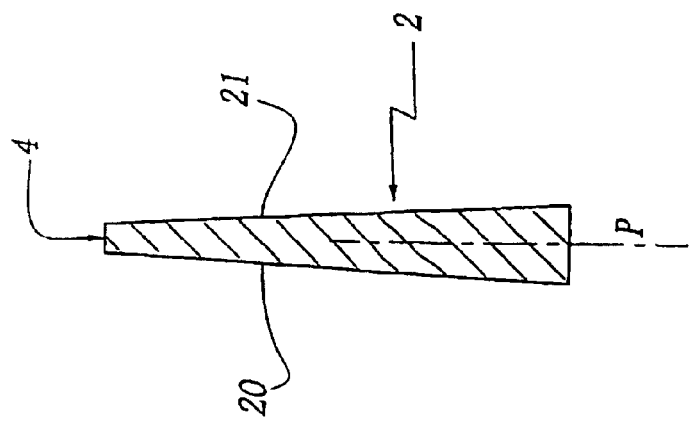
FIG. 2 is an end view of the body of the blade shown in FIG. 1, during a step a) in a first implementation of the method, without the make-up material.
Figure 6:
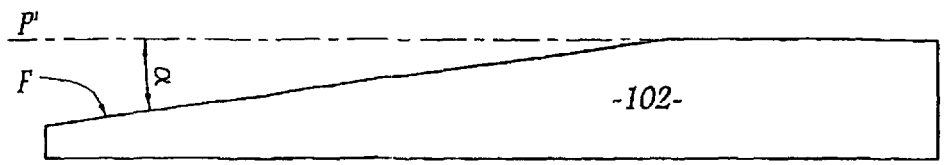
FIGS. 6 to 11 show a second implementation of the method.

In a first implementation of the method, the body 2 of the blade has its sides 20 and 21 converging a little towards each other so to form a free edge on the body of the blade. Specifically, this free edge is a flat horizontal surface 4 that can be seen in FIG. 2 extending perpendicularly to a main plane P of the blade body 2. As shown in FIG. 3, in a second step of the method, a make-up material M is deposited in the form of a powder 5 or a mixture of powders on said free edge 4, and preferably under pressure. The powder or powder mixture comprises at least two elements 50 and 51 forming the make-up material M. One of these elements is a particle 50 of great hardness. Advantageously it is a titanium carbide. The other element is a particle 51 of stainless steel of food grade, advantageously of the same type as that making up the blade body 2.

Given the different physical and mechanical properties of the elements 50 and 51 making up the make-up material M in powder form, when they are projected onto the free edge 4 of the blade body, variations are observed in the flow of the powder 5. In order to maintain a uniform deposited bead 6 of powder, pairs of particles 50 and 51 of different types are connected together, e.g. by inclusion. Advantageously, particles 50 of titanium carbide are included in particles 51 of stainless steel. This inclusion may be total, with the titanium carbide then forming the core of a particle made up of both materials, or it may be partial, with the particle of titanium carbide being received in a socket formed in a particle of stainless steel.

In another configuration, the titanium carbide particles 50 are agglomerated with one another by a binder so as to obtain agglomerations of titanium carbide particles of a size that encourages flow thereof.

In a variant, the powder 5 is made uniform by means of a binder serving to bond together the particles of stainless steel or titanium carbide.

A powder 5 is thus prepared which, in spite of the differences in the density and/or shape of the particles 50 and 51 making it up, nevertheless presents a composition that is uniform at all points along the bead 6 of powder 5 that is deposited on the free edge 4 of the blade body 2, with the particles 50 and 51 being distributed regularly, overall.

At the same time as this powder or powder mixture is projected under pressure, it is subjected to a laser beam 8 simultaneously with deposition thereof so as to raise it to a melting temperature such that the bead 6 of powder 5 merges intimately with the blade body 2. That technique is known in the field of surface coatings as being a method for applying a facing. As an example illustrating this technique as such, reference can be made for example to the Internet site www.irepa-laser.com, or to the publication "Traitement de surface d'un gaz léger par plasma produit par laser en vue d'améliorer la résistance mécanique" [Surface treatment of a light gas by a plasma produced by laser in order to improve mechanical strength] by Mr. Sicard, Gremi, Orleans.

Figure 5:
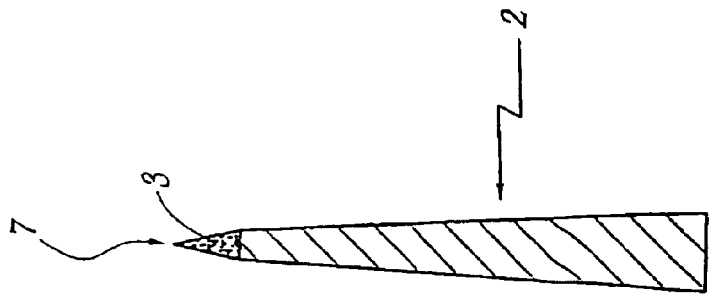
FIGS. 4 and 5 are end views analogous to FIG. 2 showing step d) of the method.
Figure 4:
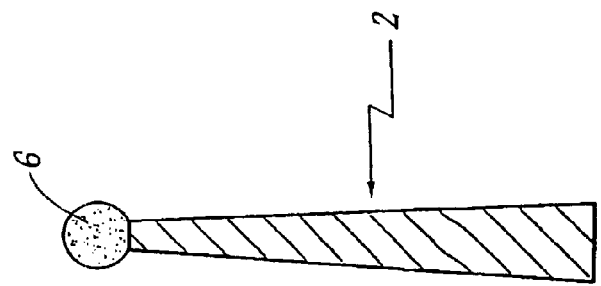

Once the bead 6 has been deposited and merged onto the edge 4, a finishing operation needs to be performed in order to form the cutting edge 3 proper. This operation consists in machining or grinding so as to shape the bead 6 so as to give it a sharp edge 7, as shown in FIG. 5.

In a variant, it is possible to perform the operation of finishing the cutting edge 3 simultaneously with the operation of finishing the blade body 2. Under such circumstances, the bead 6 is deposited on the blade body 2 before proceeding with the finishing as mentioned above. The grinding or machining are then performed not only on the bead 6, but also on the blade body 2. The machining or grinding are performed using conventional means, for example using diamond grinding wheels.

In another implementation of the method, as shown in FIGS. 6 to 11, the powder 105 is projected not onto a flat horizontal surface 4 of the blade body, but onto a face F thereof, which face slopes gently towards the cutting edge 103. The face F of the blade body 102 is prepared prior to depositing the make-up material M.

The face F slopes at a non-zero angle $\alpha$ relative to a main plane P' of the blade body 102.

Figure 7:
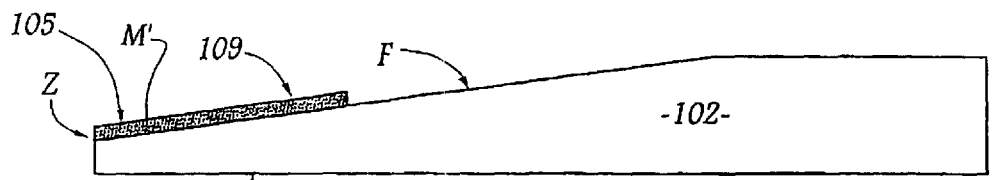

As shown in FIG. 7, this slope enables a bead or strip 109 of make-up material M' in powder form 105 to be deposited.

The deposition and sintering of the make-up material powder 105 are performed in such a manner that one of the end zones Z of the strip 109 is adjacent to the end of the face F of the blade body 102.

Advantageously, after this step of depositing and sintering the powder 5 or 105 of make-up material on the blade body 2 or 102, a hardening and tempering operation is performed in conventional manner. This hardening and tempering serves to "release" the stresses to which the blade body 2, 102 and/or the make-up material have been subjected.

Figure 8:
Figure 9:
Figure 10:
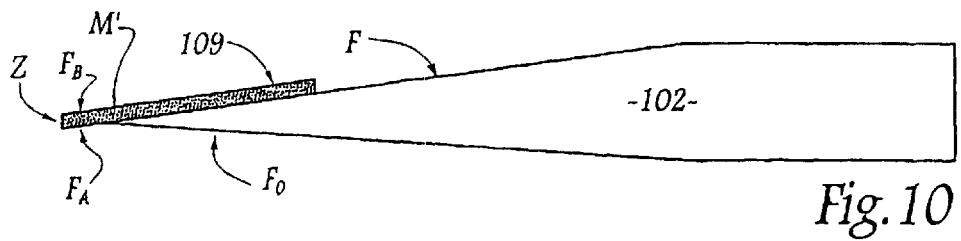

Material is removed from the blade body 102 from its face $F_O$ opposite its face F, as shown in FIGS. 8 and 9. This removal is performed using conventional techniques, e.g. machining, grinding, or abrasion.

Figure 11:
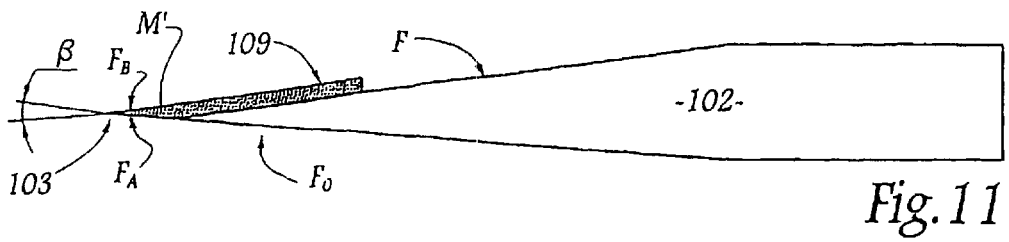

The material constituting the blade body is removed from the vicinity of the cutting edge 103 in a direction and over an area that makes it possible, as shown in FIG. 11, to align said face $F_O$ with one of the faces $F_A$ of the cutting edge 103 once it has been finished. Thus, the faces $F_O$ and $F_A$ are generally coplanar.

The finished cutting edge 103 has two faces $F_A$ and $F_B$ that make a non-zero angle β relative to each other, advantageously lying in the range 5° to 60°, such that the two faces $F_A$ and $F_B$ define a cutting edge 103 in the form of a point. This point is formed using conventional techniques of removing material M' from the face $F_A$. This removal, in particular by machining, grinding, or abrasion, is localized in an end zone Z or a free edge of the strip 109. This end zone Z is constituted by a region of the strip 109 that does not rest on the face F of the body 102, after material of the body 102 has been removed.

Thus, as shown in FIG. 11, the cutting edge 103 is formed by a strip 109 of make-up material M', said strip resting in part on an edge of the blade body 102.

In another configuration, material can be removed or lapped from the face F of the body 102 so as to form a zone for receiving the make-up material M'. The depth of this removal is adapted so that once the make-up material M' has been deposited the top free face of the strip 109 is generally coplanar with the face F of the body 102.

In another embodiment, it is possible to envisage depositing the make-up material M' on only a portion of the cutting edge, e.g. the portion that is stressed the most frequently, so as to increase the lifetime of said portion only.

In another configuration, the faces $F_A$, $F_B$ of the edge 103 are perpendicular.

In another implementation, it is possible to use a make-up material of a color that is different from the color of the blade body. Similarly, the dimensions and the shape of the strip of make-up material may be different from those described.

In both implementations of the method described above, it is possible to mark the portion of the cutting edge which is formed by the make-up material.

The invention claimed is:

1. A method of fabricating a blade for at least one of a knife, a pair of scissors, a saw, or a household appliance, the blade being made of steel or an alloy of stainless steels and having at least one cutting edge extending over at least a portion of its periphery thereof, the method comprising the following steps:
   a) making a blade body possessing at least three free edges provided in a vicinity of the at least one cutting edge;
   b) projecting a make-up material in the form of a powder onto one of the at least three free edges wherein said one of the at least three free edges is formed by a flat horizontal surface extending perpendicularly to a main plane of the blade body, the hardness of the make-up material being greater than the hardness of the blade body wherein said powder contains at least two elements connected together;
   c) subjecting the make-up material powder to a laser beam at the same time as projecting the make-up material powder so as to form a bead or strip on at least a portion of one of the at least three free edges so that the bead or strip melt instantaneously with blade body to form an intimate bond with the blade body;
   d) after said intimate bond is formed, performing a hardening and tempering operation on the blade body and the bead or strip; wherein said blade body is fitted with the bead or strip of the make-up material; and
   e) forming the cutting edge in the bead or strip of make-up material so as to form a sharp edge.

2. A method according to claim 1, wherein the blade body presents dimensions that are slightly smaller than those of the final blade.

3. A method according to claim 1, wherein the at least one cutting edge is made by grinding, machining, or abrading at least the bead or the strip of make-up material.

4. A method according to claim 1, wherein the blade body is machined or ground before the step of forming the bead of make-up material.

5. A blade for at least one of a knife, a pair of scissors, a saw, or a household appliance, the blade having at least one cutting edge on at least a portion of a periphery thereof, and having a blade body, the at least one cutting edge being supported on an edge of the blade body and made by a process comprising the following steps:
   a) making a blade body processing at least three free edges provided in a vicinity of the at least one cutting edge;
   b) projecting a make-up material in the form of a powder onto one of the at least three free edges wherein said one of the at least three free edges is formed by a flat horizontal surface extending perpendicularly to a main plane of the blade body, the hardness of the make-up material being greater than the hardness of the blade body wherein said powder contains at least two elements connected together;
   c) subjecting the make-up material powder to a laser beam at the same time as projecting the make-up material powder so as to form a bead or strip on at least a portion of one of the at least three free edges so that the bead or strip melt instantaneously with blade body to form an intimate bond with the blade body;
   d) after said intimate bond is formed, performing a hardening and tempering operation on the blade body and the bead or strip; wherein said blade body is fitted with a bead or strip of the make-up material; and
   e) forming the cutting edge in the bead or strip of make-up material so as to form a sharp edge.

6. A blade according to claim 5, wherein the at least one cutting edge and the blade body are made of at least two different materials.

7. A cutting tool for at least one of knife, a pair of scissors, a saw, or a household appliance, having at least one blade and made by a process comprising the following steps:
   a) making a blade body possessing at least three free edges provided in a vicinity of the at least one cutting edge;
   b) projecting a make-up material in the form of a powder onto one of the at least three free edges wherein said one of the at least three free edges is formed by a flat horizontal surface extending perpendicularly to a main plane of the blade body, the hardness of the make-up material being greater than the hardness of the blade body wherein said powder contains at least two elements connected together;

c) subjecting the make-up material powder to a laser beam at the same time as projecting the make-up material powder so as to form a bead or strip on at least a portion of one of the at least three free edges so that the bead or strip melt instantaneously with blade body to form an intimate bond with the blade body;

d) after said intimate bond is formed, performing a hardening and tempering operation on the blade body and the bead or strip; wherein said blade body is fitted with a bead or strip of the make-up material; and e) forming the cutting edge in the bead or strip of make-up material so as to form a sharp edge.

8. A method according to claim 1, wherein said at least two elements are connected together by inclusion.

9. A method according to claim 1, wherein said at least two elements are connected together by agglomeration.

10. A method according to claim 1, wherein said at least two elements are connected together by a binder.

11. A method according to claim 5, wherein said at least two elements are connected together by inclusion.

12. A method according to claim 5, wherein said at least two elements are connected together by agglomeration.

13. A method according to claim 5, wherein said at least two elements are connected together by a binder.

14. A method according to claim 7, wherein said at least two elements are connected together by inclusion.

15. A method according to claim 7, wherein said at least two elements are connected together by agglomeration.

16. A method according to claim 7, wherein said at least two elements are connected together by a binder.

* * * * *